US007230733B2

(12) United States Patent
Adegawa

(10) Patent No.: US 7,230,733 B2
(45) Date of Patent: Jun. 12, 2007

(54) COMMUNICATION CONTROL METHOD OF INTERNET FACSIMILE AND INTERNET FACSIMILE

(75) Inventor: Tomomichi Adegawa, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 759 days.

(21) Appl. No.: 09/962,188

(22) Filed: Sep. 26, 2001

(65) Prior Publication Data
US 2002/0075520 A1  Jun. 20, 2002

(30) Foreign Application Priority Data
Dec. 20, 2000 (JP) ............................. 2000-387292

(51) Int. Cl.
*G06F 3/12* (2006.01)
(52) U.S. Cl. ............ 358/1.15; 358/402; 358/403; 358/404; 358/405; 358/407; 358/426.09; 358/440; 709/207
(58) Field of Classification Search .......... 358/402, 358/403, 405, 407, 426.09, 440, 404, 1.15; 709/207
See application file for complete search history.

(56) References Cited

U.S. PATENT DOCUMENTS

| 5,563,986 | A | * | 10/1996 | Suzuki | 358/1.15 |
| 5,933,247 | A | * | 8/1999 | Shibata | 358/404 |
| 6,101,244 | A | * | 8/2000 | Okada | 379/100.08 |
| 6,466,330 | B1 | * | 10/2002 | Mori | 358/1.15 |
| 6,493,103 | B2 | * | 12/2002 | Toyoda et al. | 358/1.15 |
| 6,496,573 | B1 | * | 12/2002 | Ichimura | 379/100.06 |
| 6,618,749 | B1 | * | 9/2003 | Saito et al. | 709/207 |
| 6,801,546 | B1 | * | 10/2004 | Yoshida et al. | 370/490 |
| 6,816,911 | B1 | * | 11/2004 | Toyoda et al. | 709/238 |
| 6,823,367 | B1 | * | 11/2004 | Wakasugi et al. | 709/206 |

FOREIGN PATENT DOCUMENTS

| JP | A 09-121274 | 5/1997 |
| JP | A 10-013655 | 1/1998 |
| JP | A 11-191835 | 7/1999 |
| JP | A 11-225263 | 8/1999 |

* cited by examiner

*Primary Examiner*—Kimberly Williams
*Assistant Examiner*—Michael Burleson
(74) *Attorney, Agent, or Firm*—Oliff & Berridge, PLC

(57) ABSTRACT

A communication control method of an Internet facsimile may provide transmitting and receiving document information via the Internet and transmitting and receiving facsimile image information via a public switched telephone network. The method may include receiving a relay result returned from a relay broadcast distribution station in the form of an electronic mail if a transmission error occurs in transmitting information from the Internet facsimile to a destination via the Internet. Based on the received relay result, a communication management report may be prepared that indicates the occurrence of the error if the error occurs. An image corresponding to the information may be attached to the report. The report may be output in the form of an electronic mail. An Internet facsimile may include a communication section, a communication management report preparation section, an image attaching section, and a communication management report output section, which carry out such a method.

12 Claims, 12 Drawing Sheets

FIG. 3

" COMMUNICATION MANAGEMENT REPORT (00/11/08/18:00) "

<TRANSMISSION>

| DATE | TIME OF DAY | ASSOCIATED PARTY NAME | COMMUNICATION | TIME | NUMBER OF SHEETS | COMMUNICATION RESULT | CHARGE | DOCUMENT |
|---|---|---|---|---|---|---|---|---|
| 11/11/07 | 16:58 | XXX COMPANY | FACSIMILE | 0:15 | 2 | OK | ¥10 | 007 |
| 11/11/07 | 17:03 | iky@ifax.co.jp | E-MAIL | 0:25 | 3 | OK | – | 008 |
| 11/11/07 | 18:34 | YYY COMPANY | FACSIMILE | 3:15 | 17 | OK | ¥90 | 009 |
| 11/11/08 | 09:42 | 03 7890 7890 | FACSIMILE | 1:55 | 9 | INTERRUPT | – | 012 |
| 11/11/08 | 09:46 | WWW COMPANY | FACSIMILE | 3:15 | 18 | OK | – | 013 |
| 11/11/08 | 13:06 | stm@ifax.co.jp | E-MAIL | 0:25 | 4 | OK | – | 015 |
| 11/11/08 | 16:13 | kngw@ifax.co.jp | E-MAIL | 0:35 | 5 | RETRANSMITTED REQUIRED | – | 018 |

<RECEPTION>

| DATE | TIME OF DAY | ASSOCIATED PARTY NAME | COMMUNICATION | TIME | NUMBER OF SHEETS | COMMUNICATION RESULT | CHARGE | DOCUMENT |
|---|---|---|---|---|---|---|---|---|
| 11/11/07 | 19:26 | XXX COMPANY | FACSIMILE | 1:50 | 9 | OK | ¥10 | 010 |
| 11/11/08 | 09:02 | YYY COMPANY | FACSIMILE | 2:45 | 15 | OK | ¥80 | 011 |
| 11/11/08 | 11:34 | cb@ifax.co.jp | E-MAIL | 1:55 | 10 | OK | – | 014 |
| 11/11/08 | 13:38 | ibrk@ifax.co.jp | E-MAIL | 5:05 | 43 | OK | – | 016 |
| 11/11/08 | 14:05 | WWW COMPANY | FACSIMILE | 1:25 | 6 | OK | ¥20 | 017 |
| 11/11/08 | 17:11 | 03 1234 5678 | FACSIMILE | 2:15 | 14 | OK | ¥80 | 019 |
| 11/11/08 | 17:45 | kngw@ifax.co.jp | E-MAIL | 3:35 | 20 | OK | – | 020 |

FIG. 4

COMMUNICATION MANAGEMENT REPORT (00/11/08/16:18)

DATE : 00/11/08
TIME OF DAY : 16:13:42
ASSOCIATED PARTY NAME : kngw@ifax.co.jp
COMMUNICATION : E_MAIL
TIME : 0:35
NO. OF SHEETS : 5

< FIRST SHEET OF UNTRANSMITTED DOCUMENT >

TO : MR. XXX (PLANNING DEVELOPMENT SECTION)
FROM : XXXX (COMMODITY DEVELOPMENT SECTION)
SUBJECT : MEETING ON NOVEMBER 10
NO. OF TRANSMITTED SHEETS : 5 (CONTAINING THE COVER)

MEETING ON NOVEMBER 10 (FRI.) WILL BE HELD AT 1:00PM IN THE THIRD CONFERENCE ROOM ON THE SECOND FLOOR OF THE HEAD OFFICE. WOULD YOU LIKE TO COUNT THE NUMBER OF PEOPLE PRESENT FROM THE PLANNING AND DEVELOPMENT SECTION? NOTIFY ME OF THE NUMBER AS SOON AS POSSIBLE. THE MATERIAL TO BE USED AT THE MEETING AND A MAP OF THE LOCATION OF THE THIRD CONFERENCE ROOM ARE SENT.

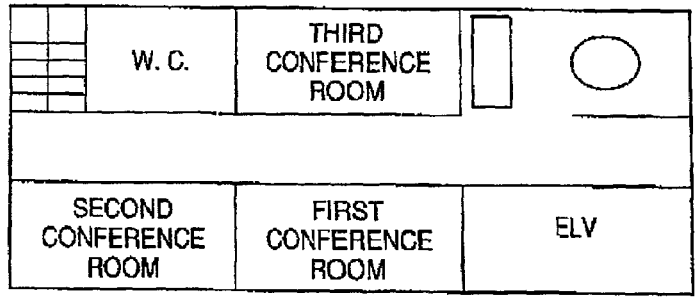

COMMUNICATION CONTROL METHOD OF INTERNET FACSIMILE AND INTERNET FACSIMILE

BACKGROUND OF THE INVENTION

1. Field of the Invention

This invention relates to a communication control method of an Internet facsimile and an Internet facsimile, and particularly to those to attach an image of at least a part of an untransmitted document to a communication management report to be output when a transmission error is caused to occur.

2. Description of the Related Art

Hitherto, an Internet facsimile has been in practical use, which has a function of transferring data on a local area network (LAN) and on the Internet, and a function of transmitting and receiving a normal facsimile message via a public switched telephone network (PSTN).

Since such an Internet facsimile can be used to transfer image information between remote locations on the Internet, the communication costs can be reduced drastically.

When a document transmitted as a normal facsimile message causes a transmission to occur, a report indicating non-transmission with the untransmitted document attached is also output on the Internet facsimile like a normal facsimile.

However, if a document transmitted by electronic mail causes a transmission error to occur in the Internet facsimile in the related art, the Internet facsimile receives only electronic mail indicating non-transmission and thus it is difficult for the user of the transmitting person to determine which document causes the transmission error to occur.

Since the time required for receiving electronic mail indicating a transmission error increases in proportion to the information amount of a communication history, confusion of the user is caused.

SUMMARY OF THE INVENTION

It is therefore an object of the invention to provide a communication control method of an Internet facsimile and an Internet facsimile for making it possible for the user to easily determine the document causing a transmission error to occur by effectively using a communication management report to which a communication history is attached.

To the end, according to the invention, there is provided a communication control method of an Internet facsimile for transmitting and receiving document information via the Internet and transmitting and receiving facsimile image information via a public switched telephone network, the communication control method comprising the steps of, if a transmission error occurs in the document information transmitted via the Internet, preparing a communication management report indicating occurrence of the transmission error, and attaching the image corresponding to the untransmitted document information to the prepared communication management report for output.

The communication management report is a report recording the communication state (for example, date, time of day, associated party name, communication means, communication time, the number of transmitted sheets, etc.,). If the image of the untransmitted document (for example, top page thereof) is attached to the communication management report, the user can easily determine the document causing a transmission error to occur.

According to the invention, if a transmission error occurs in document information transmitted with a relay broadcast communication instruction given, a relay result returned from the relay broadcast distribution station giving the relay broadcast communication instruction is received, and an untransmitted image is attached to the received relay result for output.

The relay result is a report recording the relay broadcast destinations of relay broadcast, the relay broadcast date and time, the execution result of relay broadcast (OK or NG), etc.

According to the invention, when electronic mail received via the Internet is transferred as facsimile image information, if a transmission error occurs in the transfer of the facsimile image information, a communication management report indicating occurrence of the transmission error is prepared, and that an untransmitted image is attached to the prepared communication management report and the communication management report to which the untransmitted image is attached is transmitted to the transmitting person of the electronic mail as electronic mail.

According to the invention, when electronic mail having a relay broadcast communication instruction, received via the Internet is communicated as relay broadcast communication, if a transmission error occurs in document information transmitted with the relay broadcast communication instruction given, a relay result returned from the relay broadcast distribution station giving the relay broadcast communication instruction is received, and that an untransmitted image is attached to the received relay result and the relay result to which the untransmitted image is attached is transmitted to the transmitting person of the electronic mail as electronic mail.

According to the invention, when facsimile image information received via the public switched telephone network is transferred by electronic mail, if a transmission error occurs in the electronic mail, a communication management report indicating occurrence of the transmission error is prepared, and that an untransmitted image is attached to the prepared communication management report and the communication management report to which the untransmitted image is attached is transmitted to the transmitting person of the facsimile image information as facsimile image information.

According to the invention, when facsimile image information having a relay broadcast communication instruction, received via the public switched telephone network is transferred by electronic mail, if a transmission error occurs in the electronic mail transmitted with the relay broadcast communication instruction given, a relay result returned from the relay broadcast distribution station giving the relay broadcast communication instruction is received, and that an untransmitted image is attached to the received relay result and the relay result to which the untransmitted image is attached is transmitted to a transmitting person of the facsimile image information as facsimile image information.

According to the invention, there is provided an Internet facsimile for transmitting and receiving document information via the Internet and transmitting and receiving facsimile image information via a public switched telephone network, the Internet facsimile comprising a communication management report preparation section, if a transmission error occurs in the document information transmitted via the Internet or the public switched telephone network, for preparing a communication management report indicating occurrence of the transmission error, an image attaching section for attaching the image of the untransmitted document to the communication management report prepared by the communication management report preparation section, and a communication management report output section for outputting the communication management report to which the image of the untransmitted document is attached by the image attaching section.

According to the invention, the Internet facsimile further comprises a management report transmission section, when electronic mail received via the Internet is transferred as facsimile image information, if a transmission error occurs in the transfer of the facsimile image information, the management report transmission section for attaching an untransmitted image to the communication management report prepared by the communication management report preparation section and transmitting the communication management report to which the untransmitted image is attached to the transmitting person of the electronic mail as electronic mail.

According to the invention, the Internet facsimile may further comprise a communication management report transmission section, when facsimile image information received via the public switched telephone network is transferred by electronic mail, if a transmission error occurs in the electronic mail, the communication management report transmission section for attaching an untransmitted image to the communication management report prepared by the communication management report preparation section and transmitting the communication management report to which the untransmitted image is attached to the transmitting person of the facsimile image information as facsimile image information.

According to the invention, the Internet facsimile further comprises a reception section, if a transmission error occurs in document information transmitted with a relay broadcast communication instruction given, the reception section for receiving a relay result returned from the relay broadcast distribution station giving the relay broadcast communication instruction, and a relay result output section for attaching an untransmitted image to the relay result received by the reception section and outputting the relay result to which the untransmitted image is attached.

According to the invention, the Internet facsimile further comprises a relay result transmission section, when electronic mail having a relay broadcast communication instruction, received via the Internet is communicated as relay broadcast communication, if a transmission error occurs in a document communicated as the relay broadcast communication, the relay result transmission section for attaching an untransmitted image to the relay result received by the reception section and transmitting the relay result to which the untransmitted image is attached to the transmitting person of the electronic mail as electronic mail.

According to the Invention, the Internet facsimile further comprises a relay result transmission section, when facsimile image information having a relay broadcast communication instruction, received via the public switched telephone network is transferred by electronic mail, if a transmission error occurs in the electronic mail, the relay result transmission section for attaching an untransmitted image to the relay result received by the reception section and transmitting the relay result to which the untransmitted image is attached to the transmitting person of the electronic mail as electronic mail.

According to the invention, there is provided an Internet facsimile comprising: a communication section for transmitting and receiving document information via the Internet or a public switched telephone network; a storage unit for storing the document information being received and to be transmitted; a printer; a CPU for controlling the communication system, the storage unit, and the printer, wherein the CPU operates to prepare a communication management report indicating occurrence of a transmission error if the transmission error occurs in document information to be transmitted via the Internet; the CPU operates to attach an image corresponding to the document information in the storage unit to the communication management report; and the printer outputs the communication management report.

BRIEF DESCRIPTION OF THE DRAWINGS

FIG. 3 shows an output example of a communication management report recording a communication history of transmission and reception.

FIG. 4 shows an output example of a communication management report indicating non-transmission.

DETAILED DESCRIPTION OF THE PRESENT INVENTION

Referring now to the accompanying drawings, there are shown embodiments of the invention.

Figure 1:
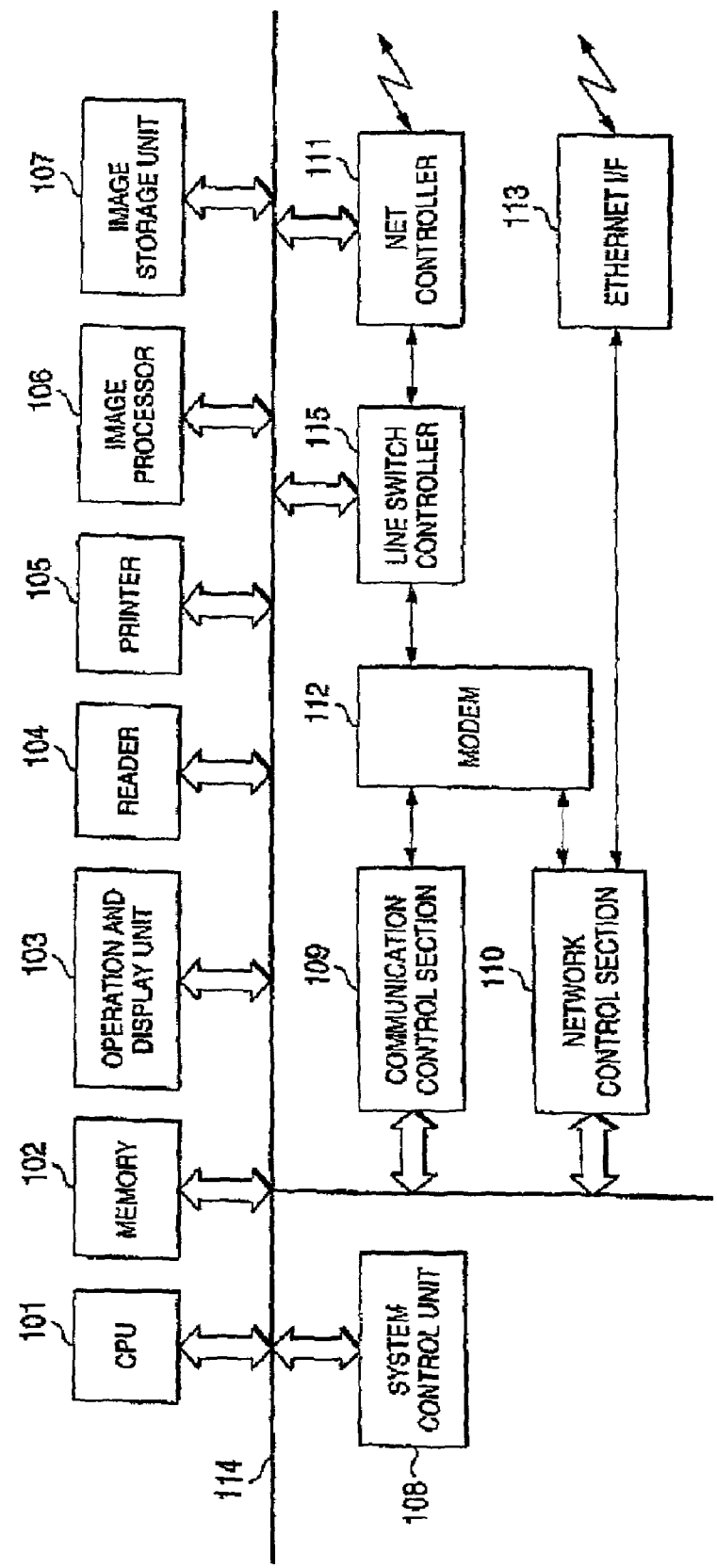
FIG. 1 is a block diagram to show the system configuration of an Internet facsimile according to the invention.

FIG. 1 is a block diagram to show the system configuration of an Internet facsimile according to the invention.

As shown in FIG. 1, the Internet facsimile comprises a CPU 101 for performing control processing of the whole facsimile, memory 102 used for a control program of the facsimile, an operation and display unit 103 used by the user to operate the facsimile, a reader 104 for reading a transmitted original, a printer 105 for printing a received image, etc., on record paper, an image processor 106 for coding, decoding, scaling up, scaling down, etc., an image, an image storage unit 107 for storing a received or transmitted image, a system control section 108 having a program (ROM) for controlling the whole Internet facsimile, a communication control section 109 for controlling communications fitted to a telephone network, a network control section 110 for controlling communications connected to a network, a net controller 111 for connecting to a net, a modem 112 (modulator-demodulator) comprising low-speed and high-speed mode functions, an Ethernet I/F 113 for connecting to Ethernet, a system bus 114 for transferring data from one component to another, and a line switch controller 115 for switching and connecting a plurality of external line interfaces and a plurality of internal communication circuits.

Of the components, the CPU 101 to the net controller 111 and the line switch controller 115 are connected by the system bus 114 via which data is transferred mutually. Further, the modem 112 and the Ethernet I/F 113 for receiving from a facsimile are provided.

Figure 2:
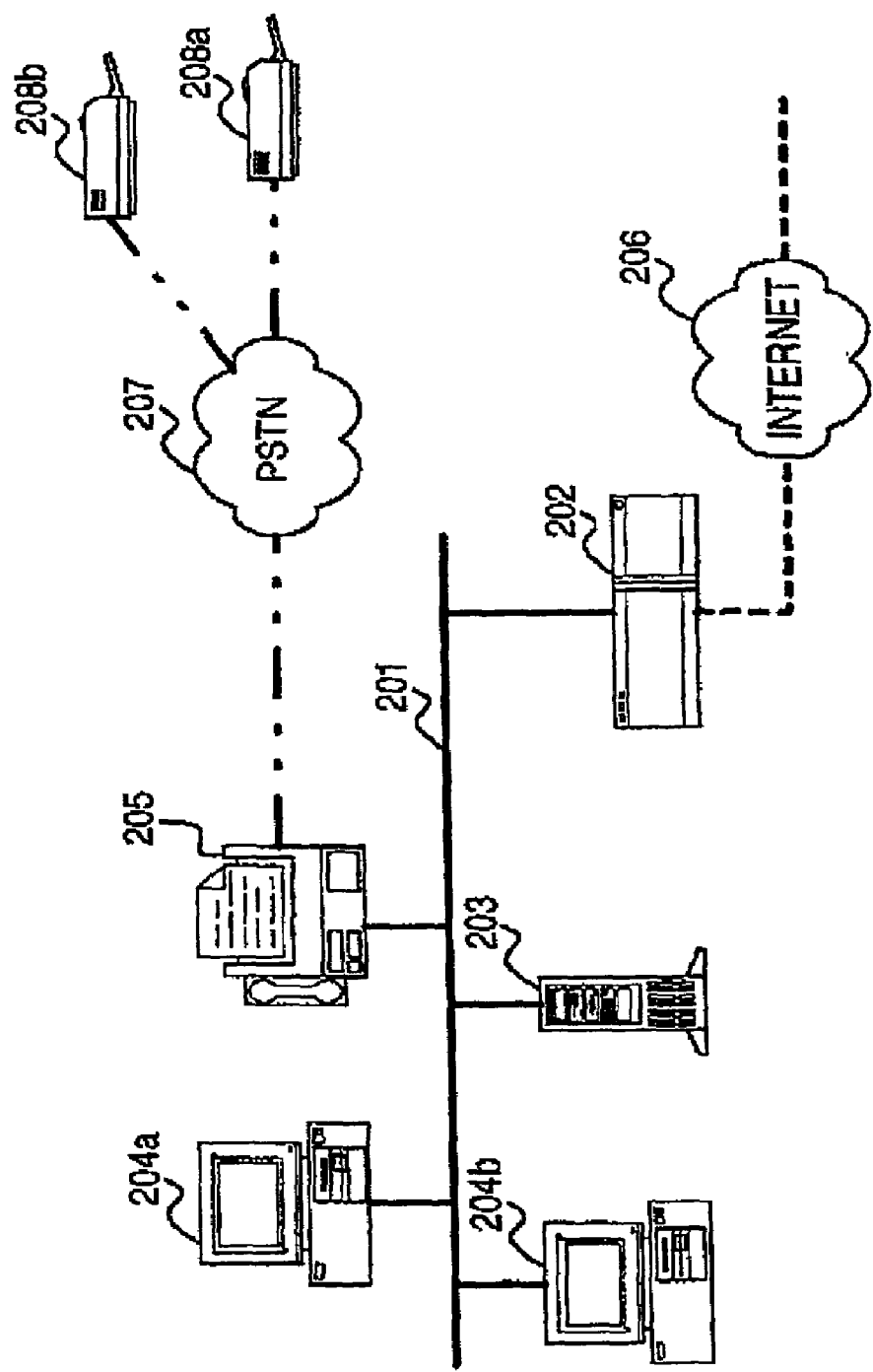
FIG. 2 is a drawing to show the configuration of a communication system including the Internet facsimile according to the invention.

Next, FIG. 2 is a drawing to show the configuration of a communication system including the Internet facsimile 205 according to the invention.

As shown in FIG. 2, the communication system including the Internet facsimile 205 is made up of a LAN 201, a router 202, and a mail server 203, a PC (personal computer) a 204a, a PC b 204b, and the Internet facsimile 205 connected to the LAN 201 as network terminals.

The mail server 203, as a POP (post office protocol) server for the PC a 204a, the PC b 204b, and the Internet facsimile 205 of the network terminals, receives electronic mail, distributes stored electronic mail addressed to each network terminal, and relays electronic mail transmitted from each network terminal for distributing to the destination in response to a request from each network terminal.

The LAN 201 is connected through the router 202 to Internet 206, enabling various data to be transferred to and from a host connected to any other LAN, etc.

The Internet facsimile 205 is connected to a PSTN 207 and can transmit and receive facsimile image information to and from any other normal facsimile a 208a or b 208b.

The described Internet facsimile stores various data corresponding to a report as shown as an output example in FIG. 3 in the memory 102 in FIG. 1.

FIG. 3 shows an output example of a communication management report recording a communication history of transmission and reception.

The communication management report is printed out on recording paper on the printer 105 in FIG. 1 each time a given time interval has elapsed or each time a given number of items are stored.

If a document transmitted from the Internet facsimile causes a transmission error to occur, a communication management report indicating non-transmission as shown as an output example in FIG. 4 is output.

FIG. 4 shows an output example of a communication management report recording a communication history of a document causing a transmission error to occur. To the report, a communication history of date, time of day, associated party name, communication means, communication time, number of transmitted sheets, etc., is attached and further the image of the untransmitted document (for example, top page) is attached for output.

Figure 5:
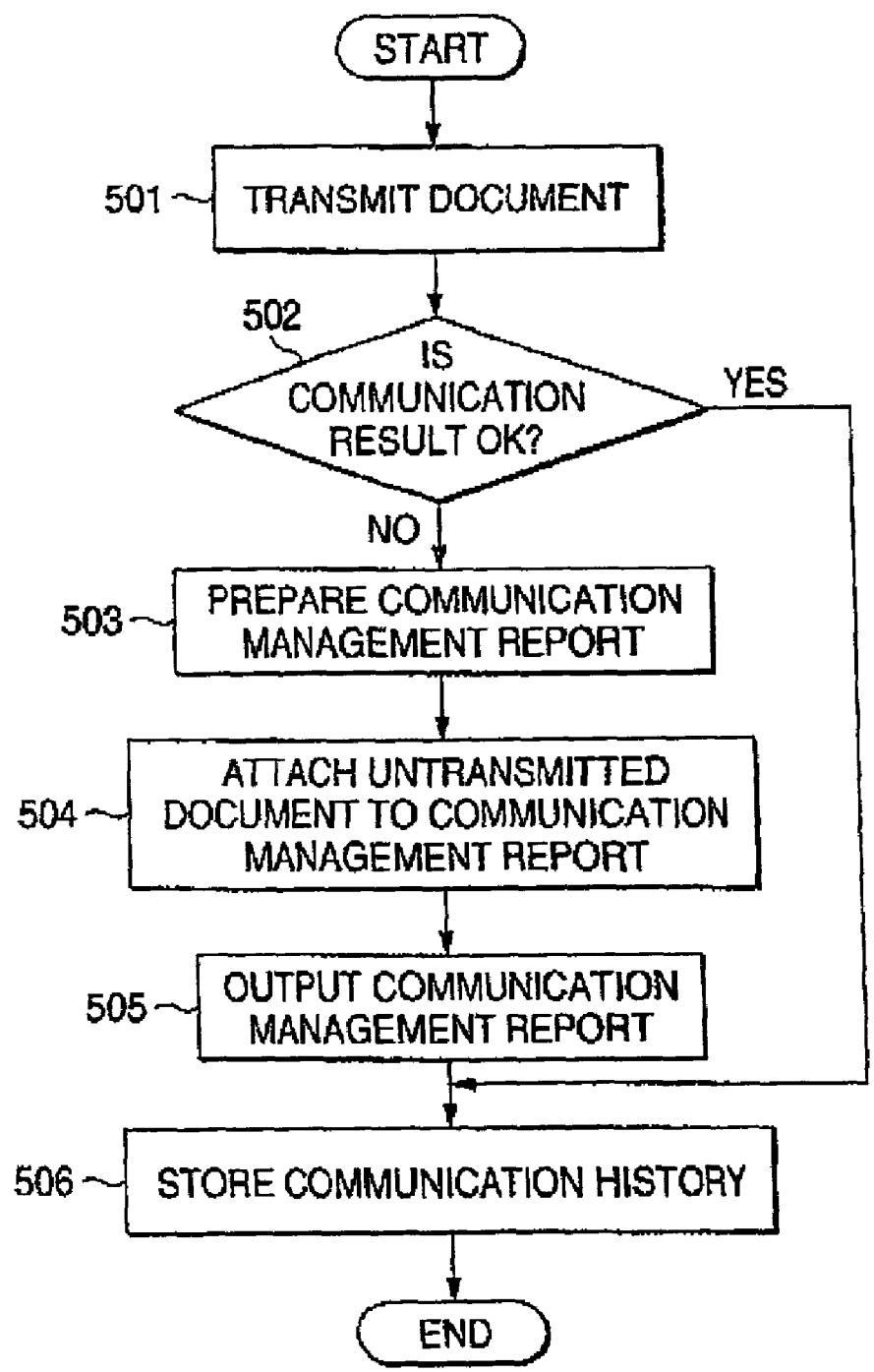
FIG. 5 is a flowchart to describe a processing procedure of output of a communication management report indicating non-transmission.

Next, a processing procedure of output of a communication management report indicating non-transmission shown in FIG. 4 will be discussed with reference to FIG. 5.

The user transmits a document from the Internet facsimile (step 501) If the communication result is OK (YES at step 502), a communication history recorded on a communication management report is stored in the memory 102 (step 506) and the processing procedure is terminated.

If a transmission error occurs (NO at step 502), a communication management report indicating occurrence of the transmission error is prepared (step 503), the image of the untransmitted document (for example, the top page thereof) is attached to the prepared communication management report (step 504), and the communication management report indicating occurrence of the transmission error is output (step 505). Then, a communication history recorded on the communication management report is stored in the memory 102 (step 506) as with the case where the communication result of document transmission is OK, and the processing procedure is terminated.

Figure 6:
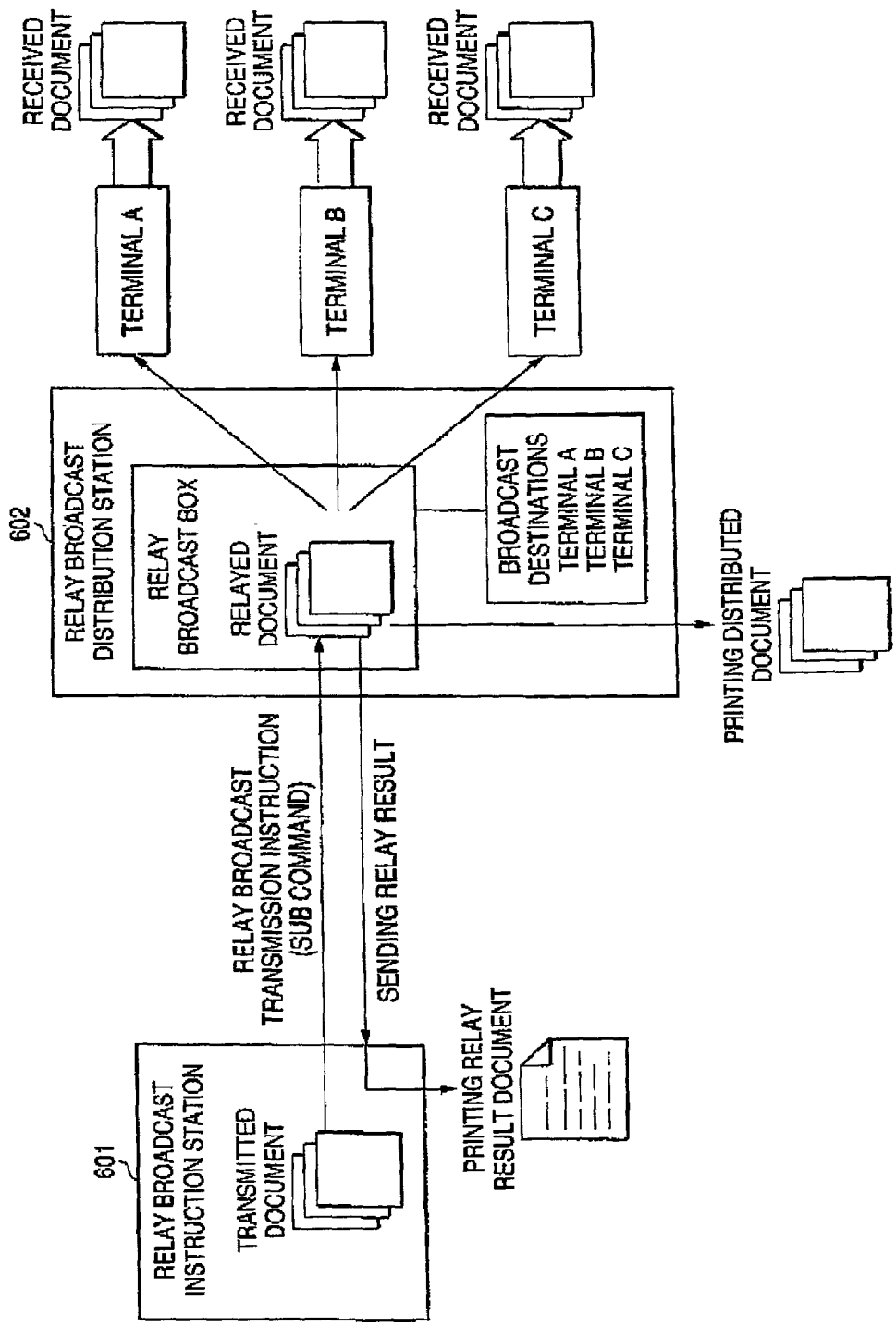
FIG. 6 is a drawing to show the operation concept of a relay broadcast communication function executed using a SUB command.

A communication method called relay broadcast communication using a SUB command is available for normal facsimile that transmits and receives image information through a PSTN. The SUB command is a command defined in ITU-T Recommendation FIG. 6 is a drawing to show the operation concept of a relay broadcast communication function executed using a SUB command.

The relay broadcast communication is as follows: A relay broadcast instruction station 601 transmits a SUB command indicating execution of relay broadcast transmission via any desired relay broadcast box to a relay broadcast distribution station 602 having a relay broadcast box. The relay broadcast distribution station 602 receiving the SUB command locates the corresponding relay broadcast box based on the SUB command, receives and stores a transmitted document from the relay broadcast instruction station 601 in the relay broadcast box, and broadcasts the relayed document in sequence to terminals A, B, and C of broadcast destinations preset corresponding to the relay broadcast box.

The relay broadcast distribution station 602 executing the relay broadcast communication prints out the document distributed to the terminals.

Upon distribution of the document to the terminals, the relay broadcast distribution station 602 sends the relay result to the relay broadcast instruction station 601. The relay broadcast instruction station 601 receiving the relay result prepares and outputs a relay result report. Information of the serial number of relay broadcast, the relay broadcast destinations corresponding to the serial number, the relay broadcast date and time, the relay broadcast execution result (OK or NG), etc., is recorded on the relay result report.

Figure 7:
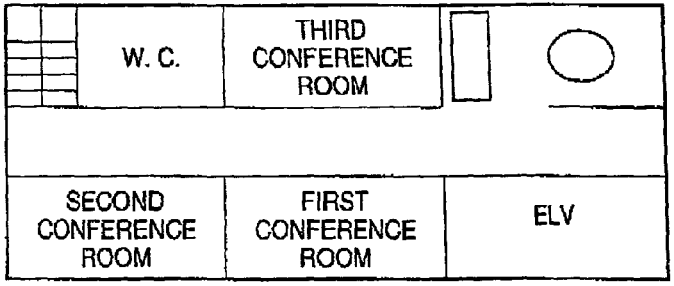
FIG. 7 shows an output example of a relay result report indicating non-transmission, sent from a relay broadcast distribution station.

If the document distributed by the relay broadcast distribution station 602 to each terminal causes a transmission error to occur, a relay result report indicating occurrence of the transmission error as shown as an output example in FIG. 7 is output.

FIG. 7 shows an output example of a relay result report prepared based on the relay result sent from the relay broadcast distribution station indicating the fact that a relay broadcasted document causes a transmission error to occur.

The image of the untransmitted document (for example, top page) together with information of relay broadcast is attached to the relay result report indicating occurrence of the transmission error for output.

Figure 8:
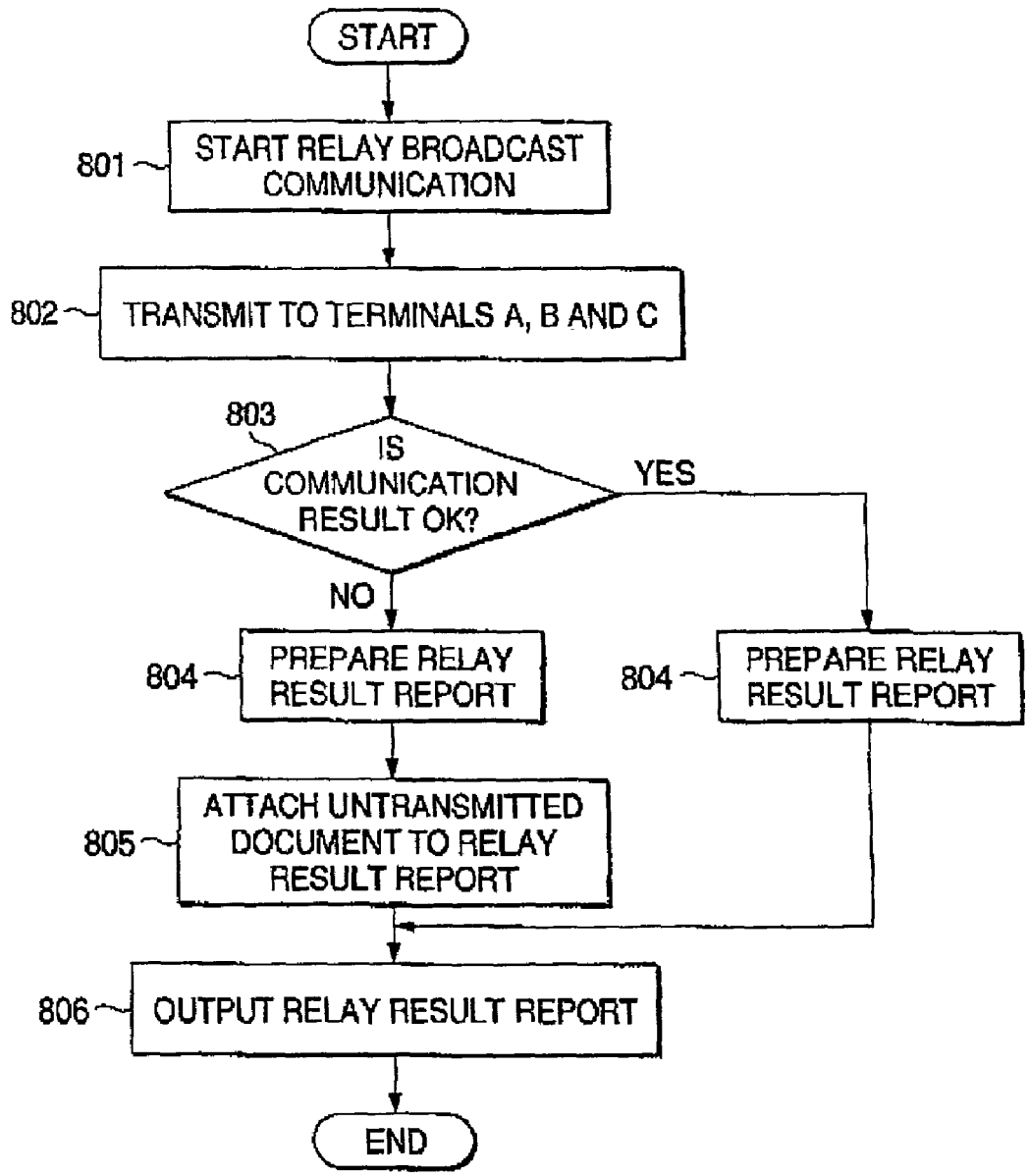
FIG. 8 is a flowchart to describe a processing procedure of output of a relay result report indicating non-transmission.

Next, a processing procedure of output of the relay result report indicating occurrence of a transmission error shown in FIG. 7 will be discussed with reference to FIG. 8.

The user transmits a document from the Internet facsimile as relay broadcast communication (step 801), and the relayed document is transmitted from the relay broadcast distribution station to the terminals A, B, and C (step 802).

If the broadcast communication result is OK (YES at step 803), the relay result is sent from the relay broadcast distribution station to the Internet facsimile, a relay result report is prepared based on the relay result (step 804), the prepared relay result report is output (step 806), and the processing procedure is terminated.

If a transmission error occurs (NO at step 803), the relay result is sent from the relay broadcast distribution station to the Internet facsimile, a relay result report is prepared based on the relay result (step 804), the image of the untransmitted document (for example, top page) is attached to the prepared relay result report (step 805), the prepared relay result report indicating occurrence of the transmission error is output (step 806), and the processing procedure is terminated.

The Internet facsimile has a function of transferring electronic mail (or e-mail) received via a LAN or the Internet as facsimile information (the function will be hereinafter referred to as E-mail To FAX Gateway) and a function of transferring facsimile image information received via a PSTN as e-mail (the function will be hereinafter referred to as FAX To E-mail Gateway).

Figure 9:
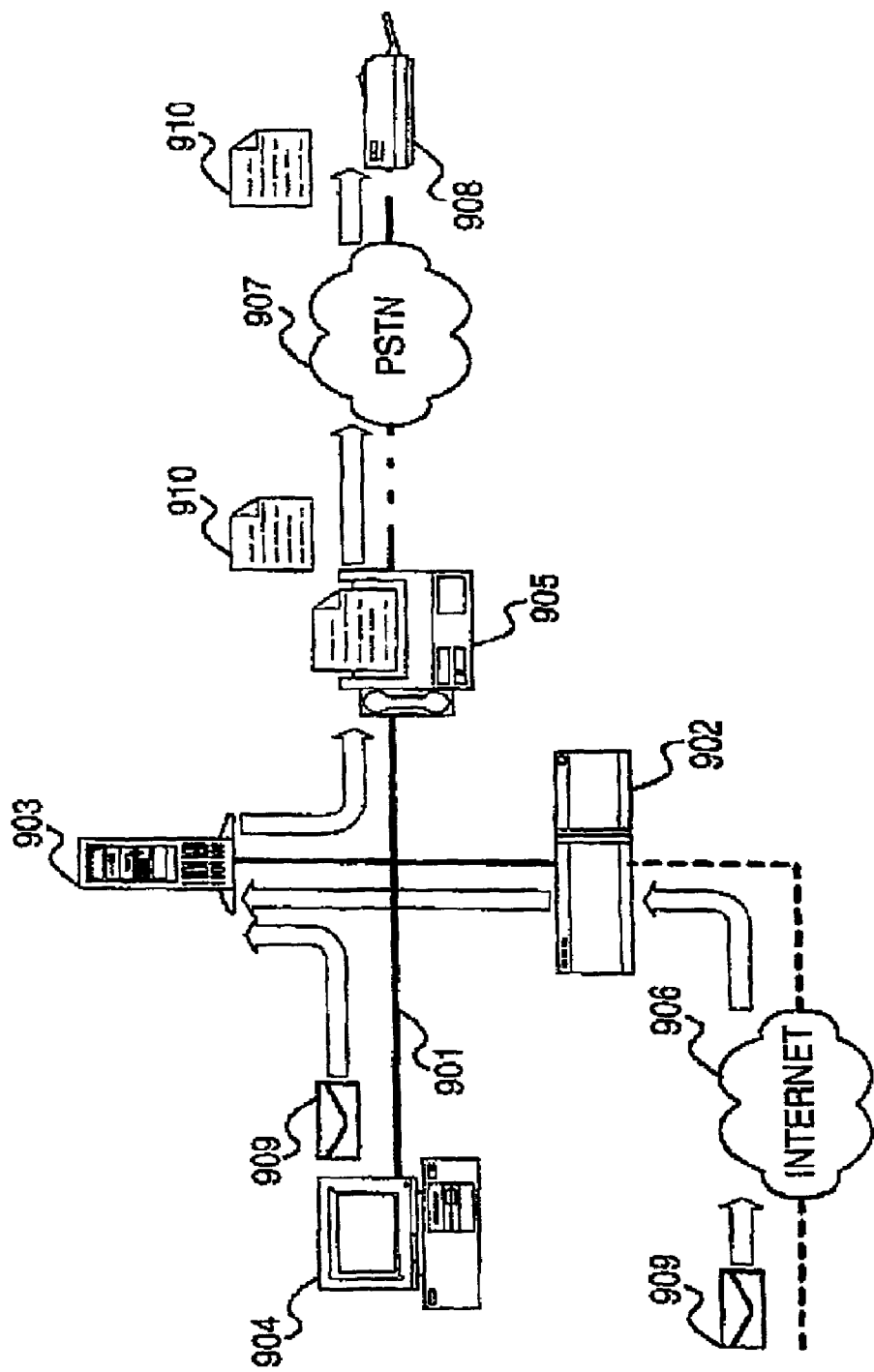
FIG. 9 is a drawing to show the configuration of an E-mail To FAX Gateway function that an Internet facsimile according to the invention has.

FIG. 9 is a drawing to show the system configuration of the E-mail To FAX Gateway function that an Internet facsimile 905 according to the invention has.

As shown in FIG. 9, the communication system including the Internet facsimile 905 is made up of a LAN 901, a router 902, and a mail server 903, a PC 904, and the Internet facsimile 905 connected to the LAN 901 as network terminals. The LAN 901 is connected through the router 902 to Internet 906, enabling various data to be transferred to and from a host connected to any other LAN, etc. The Internet facsimile 905 is connected to a PSTN 907 and can transmit and receive facsimile image information to and from any other normal facsimile 908.

The E-mail To FAX Gateway function is as follows; The Internet facsimile 905 receives various pieces of e-mail 909 arriving via the LAN 901 or the Internet 906 and can print out a facsimile document 910 under certain circumstances and if a Gateway instruction to facsimile is given, the Internet facsimile 905 transfers to the facsimile 908 as facsimile image information.

If a document transmitted with facsimile image information from the Internet facsimile as e-mail causes a transmission error to occur, a communication management report indicating occurrence of the transmission error is output, as described above.

However, if thee-mail transmitting person does not exist around the Internet facsimile in the E-mail To FAX Gateway function, even if a communication management report indicating occurrence of a transmission error is output, the transmitting person is not informed of occurrence of the transmission error.

Then, the Internet facsimile may convert a communication management report indicating occurrence of a transmission error into electronic mail and transmit the communication-management report converted into electronic mail to the e-mail transmitting person.

Figure 10:
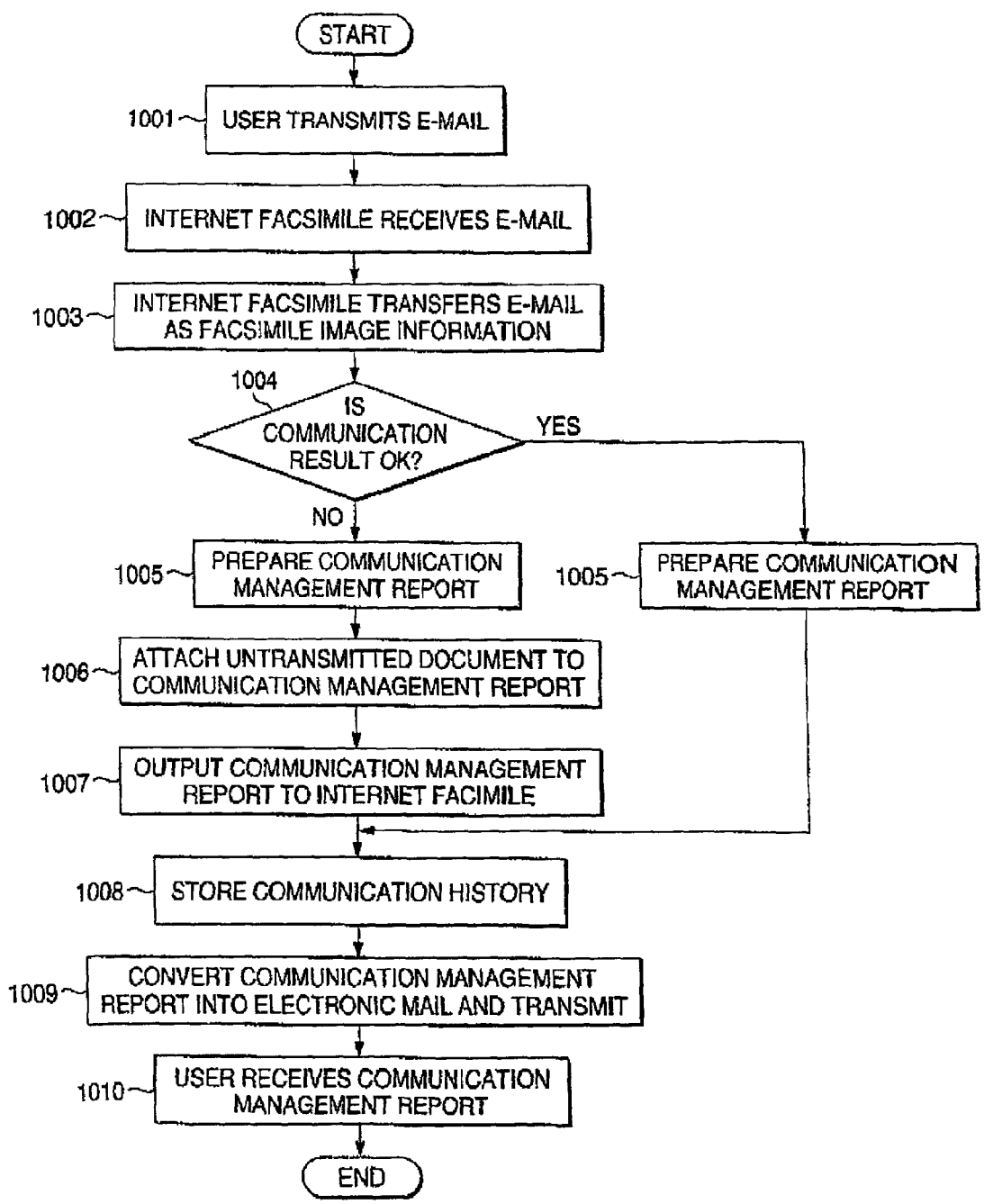
FIG. 10 is a flowchart to describe a processing procedure of converting a communication management report indicating non-transmission into electronic mail and outputting to the e-mail transmitting person.

A processing procedure of converting a communication management report indicating occurrence of a transmission error into electronic mail and transmitting to the e-mail transmitting person will be discussed with reference to FIG. 10.

The user transmits e-mail to the Internet facsimile via the LAN or the Internet (step 1001) and the Internet facsimile receives the e-mail (step 1002) and transfers the received e-mail as facsimile image information (step 1003).

If a transmission error occurs (NO at step 1004), a communication management report indicating occurrence of the transmission error is prepared (step 1005), the image of the untransmitted document (for example, the top page thereof) is attached to the prepared communication management report (step 1006), the communication management report indicating occurrence of the transmission error is output (step 1007), and a communication history recorded on the communication management report is stored in the memory 102 in FIG. 1 (step 1008)

Next, the communication management report indicating occurrence of the transmission error is converted into electronic mail and electronic mail (communication management report) is transmitted to the user (step 1009) and the user receives the communication management report indicating occurrence of the transmission error converted into electronic mail (step 1010), then the processing procedure is terminated.

If the communication result is OK (YES at step 1004), a communication management report is prepared (step 1005) as with the case where a transmission error occurs, a communication history recorded on the communication management report is stored in the memory 102 in FIG. 1 (step 1008), the communication management report is converted into electronic mail and electronic mail (communication management report) is transmitted to the user (step 1009), and the user receives the communication management report converted into electronic mail (step 1010), then the processing procedure is terminated.

Figure 11:
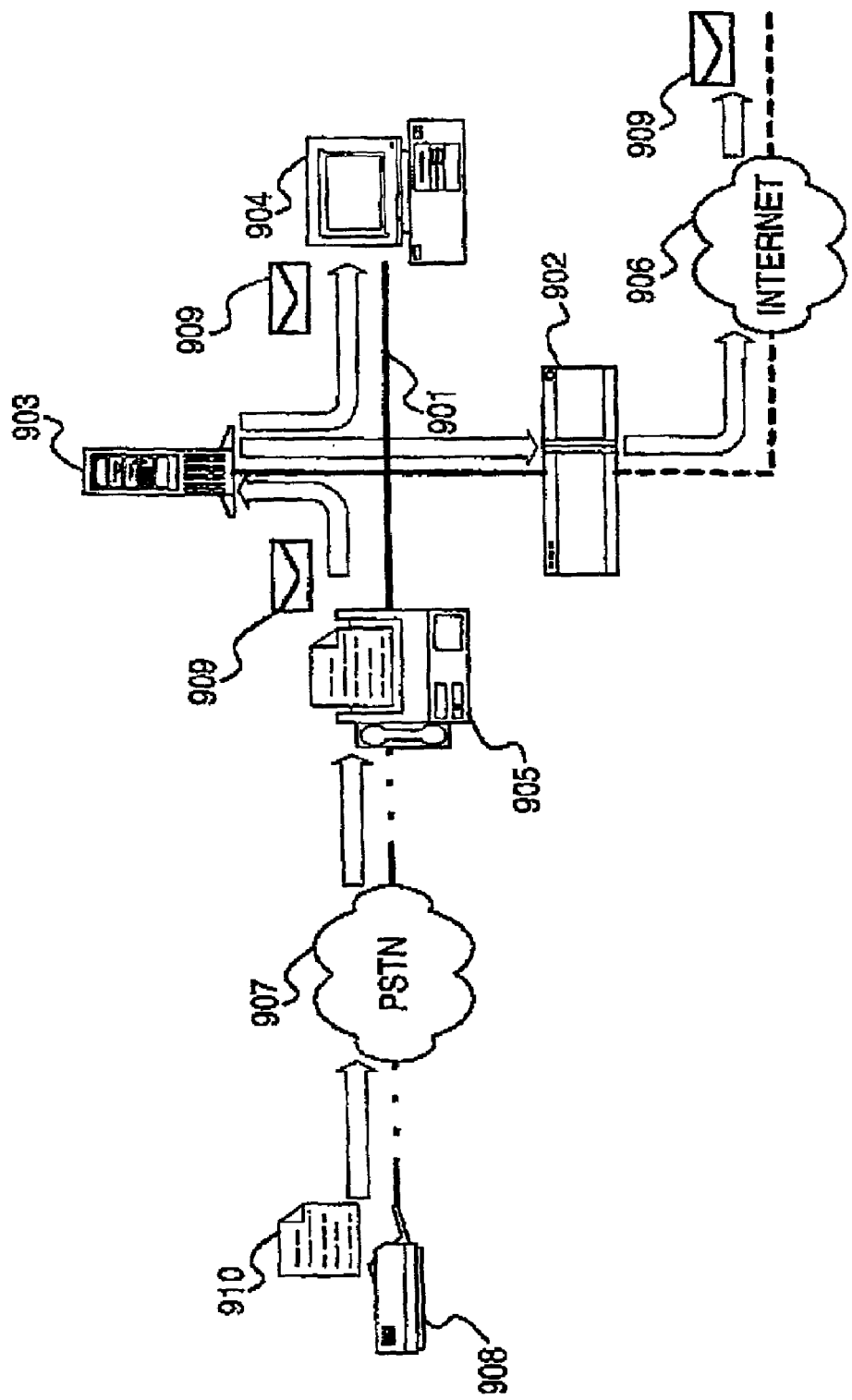
FIG. 11 is a drawing to show the configuration of a FAX To E-mail Gateway function that the Internet facsimile according to the invention has.

FIG. 11 is a drawing to show the system configuration of the FAX To E-mail Gateway function that an Internet facsimile 905 according to the invention has. For convenience of the description parts similar to those previously described with reference to FIG. 9 are denoted by the same reference numerals in FIG. 11.

The FAX To E-mail Gateway function is as follows: The Internet facsimile 905 receives various facsimile documents 910 arriving via the PSTN 907 and can print out the facsimile document 910 under certain circumstances and if a Gateway instruction to e-mail 909 is given, the Internet facsimile 905 transfers e-mail via the LAN 901 or the Internet 906.

If e-mail 909 transmitted from the Internet facsimile 905 causes a transmission error to occur in the FAX To E-mail Gateway function, e-mail indicating occurrence of the transmission error is transmitted to the Internet facsimile 905. Upon reception of the electronic mail, a communication management report indicating occurrence of the transmission error is prepared and is output on the Internet facsimile 905 and is transmitted to the facsimile 908 as facsimile image information, whereby the transmitting person is informed of occurrence of the transmission error.

Figure 12:
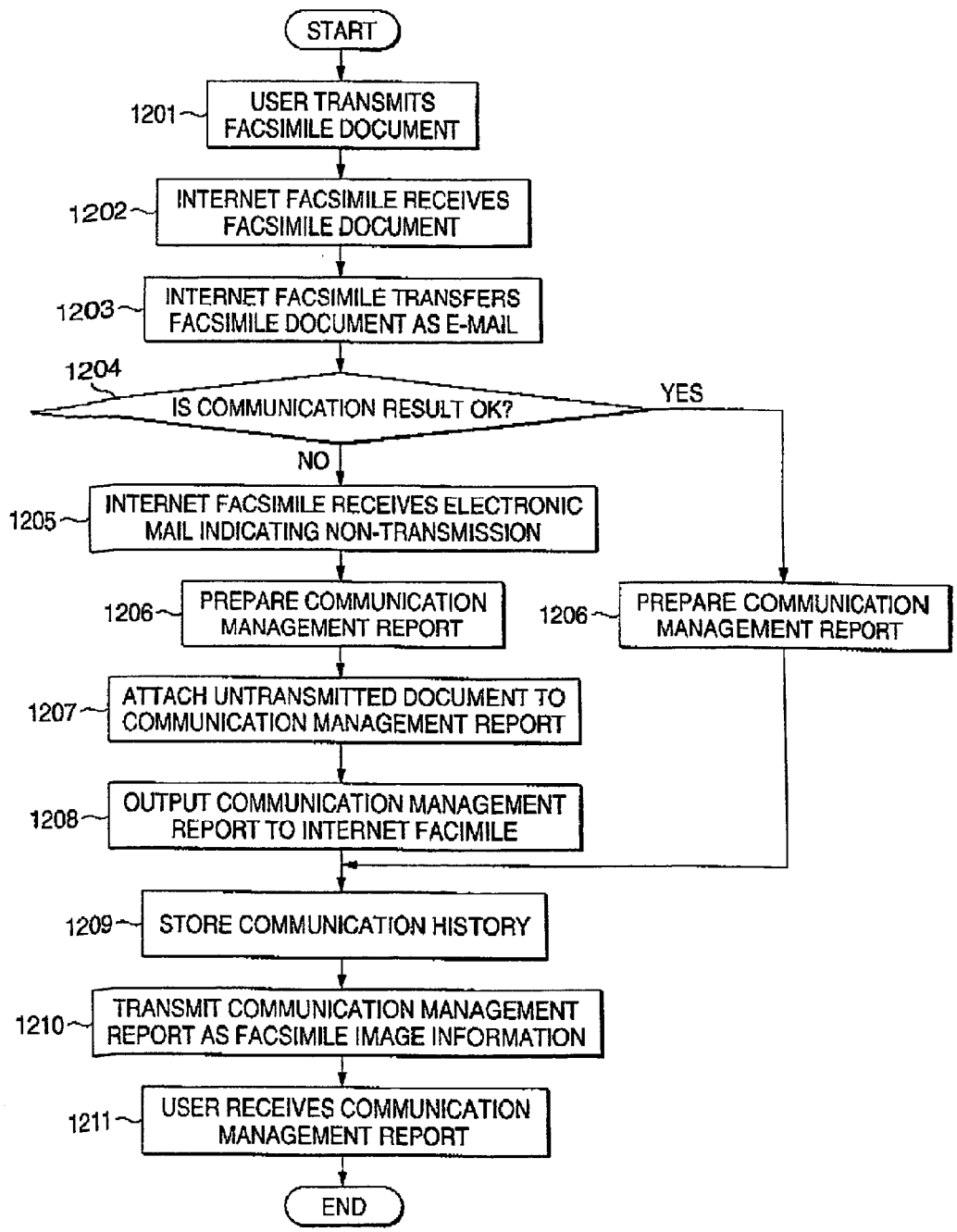
FIG. 12 is a flowchart to describe a processing procedure of transferring a communication management report indicating non-transmission to the transmitting person as facsimile image information for output.

A processing procedure of receiving electronic mail indicating occurrence of a transmission error, preparing a communication management report indicating occurrence of the transmission error, and transmitting the prepared communication management report indicating occurrence of the transmission error to the transmitting person as facsimile image information for output will be discussed with reference to FIG. 12.

The user transmits a facsimile document from the facsimile via the PSTN to the Internet facsimile (step 1201) and the Internet facsimile receives the facsimile document (step 1202) and transfers the received facsimile document as electronic mail (step 1203).

If a transmission error occurs (NO at step 1204), electronic mail indicating occurrence of the transmission error is transmitted from the mail server connected to the LAN or a network terminal-connected to any other LAN, etc. and is received at the Internet facsimile (step 1205).

Next, the Internet facsimile prepares a communication management report indicating occurrence of the transmission error (step 1206), the image of the untransmitted document (for example, the top page thereof) is attached to the prepared communication management report (step 1207) the communication management report indicating occurrence of the transmission error is output from the Internet facsimile (step 1208), and a communication history recorded on the communication management report is stored in memory (step 1209).

Next, the prepared communication management report indicating occurrence of the transmission error is transmitted to the user as facsimile image information (step 1210) and the user receives the communication management report indicating occurrence of the transmission error at the facsimile (step 1211), then the processing procedure is terminated.

If the communication result is OK (YES at step 1204), a communication management report is prepared (step 1206) as with the case where a transmission error occurs, a communication history recorded on the communication management report is stored in the memory (step 1209), the communication management report is transmitted to the user as facsimile image information (step 1210), and the user receives the communication management report at the facsimile (step 1211), then the processing procedure is terminated.

If the document transferring received electronic mail in relay broadcast communication as facsimile image information causes a transmission error to occur in the E-mail To FAX Gateway function, a relay result report indicating occurrence of the transmission error, converted into electronic mail is transmitted to the transmitting person.

If facsimile image information transmitted in relay broadcast communication is received and the document transferring the received facsimile image information by e-mail causes a transmission error to occur in the FAX to E-mail Gateway function, the Internet facsimile transferring by e-mail receives electronic mail indicating occurrence of the transmission error and prepares a communication management report indicating occurrence of the transmission error based on the electronic mail and the communication management report indicating occurrence of the transmission error is transmitted to the FAX document transmitting person through the relay broadcast instruction station.

As described above, according to the invention, if a document transmitted from the Internet facsimile causes a transmission error to occur, a communication management report to which the image of the untransmitted document is attached is output, so that the image information of the document can be checked and which document causes the transmission error to occur can be determined easily.

What is claimed is:

1. A communication control method of an Internet facsimile for transmitting and receiving document information via the Internet and transmitting and receiving facsimile image information via a public switched telephone network, the communication control method comprising:
   requesting a relay broadcast distribution station to broadcast document information to plural destinations;
   receiving a relay result returned from the relay broadcast distribution station in the form of an electronic mail;
   preparing, based on the received relay result, a communication management report indicating whether the broadcasting to each destination is a success or failure;
   attaching an image corresponding to the document information to the communication management report; and
   outputting the communication management report in the form of an electronic mail.

2. The communication control method as claimed in claim 1, further comprising:
   receiving an electronic mail to be transferred as facsimile image information,
   wherein the communication management report is prepared if the transmission error occurs upon transfer of the facsimile image information; and
   the communication management report is transmitted to a transmitter of the electronic mail.

3. The communication control method as claimed in claim 1, further comprising:
   receiving an electronic mail having the document information and a relay broadcast communication instruction via the Internet;
   converting the document information into an electronic mail;
   transmitting the electronic mail according to the relay broadcast communication instruction; and
   receiving a relay result returned from a relay broadcast distribution station if the transmission error occurs in the document information transmitted to the relay broadcast distribution station,
   wherein the communication management report is prepared based on the relay result; and
   the communication management report is prepared to a transmitter of the electronic mail in the form of electronic mail.

4. The communication control method as claimed in claim 1, comprising:
   receiving facsimile image information from the public switched telephone network;
   converting the facsimile image information into an electronic mail; and
   wherein the communication management report is prepared if the transmission error occurs upon transfer of the electronic mail; and
   the communication management report is transmitted to a transmitter of the facsimile image information in the form of facsimile image information.

5. The communication control method as claimed in claim 1, further comprising:
   receiving facsimile image information having a relay broadcast communication instruction from the public switched telephone network;
   converting the facsimile image information into an electronic mail; and
   transferring the electronic mail to the relay broadcast distribution station according to the relay broadcast communication instruction,
   receiving a relay result returned from the relay broadcast distribution station if the transmission error occurs in the document information transmitted to the relay broadcast distribution station,
   wherein the communication management report is prepared based on the relay result; and
   the communication management report is prepared to a transmitter of the facsimile image information in the form of facsimile image information.

6. An Internet facsimile comprising:
   a communication section for transmitting and receiving document information via the Internet or a public switched telephone network, wherein the communication section requests a relay broadcast distribution station to broadcast document information to plural destinations;

a communication management report preparation section for preparing a communication management report indicating whether the broadcasting to each destination is a success or failure;

an image attaching section for attaching an image corresponding to the document information to the communication management report; and a communication management report output section for outputting the communication management report in the form of an electronic mail.

7. The Internet facsimile as claimed in claim 6, further comprising:

a management report transmission section for transmitting the communication management report to a transmitter of an electronic mail when the electronic mail is received via the Internet and transferred as facsimile image information.

8. The Internet facsimile as claimed in claim 6, further comprising:

a communication management report transmission section for transmitting the communication management report to a transmitter of a facsimile image information in the form of facsimile image information when the facsimile image information is received via the public switched telephone network and transferred by electronic mail.

9. The Internet facsimile as claimed in claim 6, further comprising:

a reception section for receiving a relay result returned from a relay broadcast distribution station if a transmission error occurs in the document information transmitted to the relay broadcast communication station; and wherein the communication management report preparation section prepares the communication management report based on the relay result.

10. The Internet facsimile as claimed in claim 9, further comprising:

a communication management report transmission section for transmitting the communication management report to a transmitter of the electronic mail in the form of electronic mail.

11. The Internet facsimile as claimed in claim 9, further comprising:

a communication management report transmission section for transmitting the communication management report to a transmitter of the electronic mail in the form of electronic mail.

12. An Internet facsimile comprising:

a communication section for transmitting and receiving document information via the Internet or a public switched telephone network;

a storage unit for storing the document information being received and to be transmitted; and a CPU for controlling the communication system and the storage unit, wherein:

the CPU causes the communication section to request a relay broadcast distribution station to broadcast the document information to plural destinations;

the CPU operates to prepare a communication management report indicating whether the broadcasting to each destination is a success or failure, based on a relay result received from the relay broadcast distribution station;

the CPU operates to attach an image corresponding to the document information stored in the storage unit to the communication management report; and the communication section transmits the communication management report to which the image is attached, in the form of an electronic mail.

* * * * *